United States Patent [19] [11] 3,906,367

Hoeschele, Jr. et al. [45] Sept. 16, 1975

[54] METHOD AND APPARATUS FOR ERROR CORRECTION IN A DIGITAL DATA TRANSMISSION SYSTEM

[75] Inventors: David F. Hoeschele, Jr., Norristown; Gerald B. Berger, Broomall, both of Pa.

[73] Assignee: General Electric Company, Fairfield, Conn.

[22] Filed: Nov. 19, 1973

[21] Appl. No.: 417,401

[52] U.S. Cl. ............ 325/38 B; 178/69.5 R; 325/41; 340/146.1 R

[51] Int. Cl.$^2$ .................. H03K 13/32; H03K 13/22

[58] Field of Search ....... 179/15 BD, 15 BA, 15 BS, 179/15.55 R, 2 DP; 325/38 R, 38 B, 39, 40, 41, 42; 178/66 R, 68, 69.5 R; 340/146.1 R, 146.1 A, 146.1 D, 347 D

[56] References Cited

UNITED STATES PATENTS

| | | | |
|---|---|---|---|
| 3,165,588 | 1/1965 | Holzer et al. | 179/15 BD |
| 3,790,715 | 2/1974 | Inose et al. | 179/15 BA |
| 3,825,899 | 7/1974 | Haeberle et al. | 179/15 BS |

*Primary Examiner*—Benedict V. Safourek
*Attorney, Agent, or Firm*—Allen E. Amgott; Raymond H. Quist; James H. Beusse

[57] ABSTRACT

Apparatus and method for inserting a digital word of finite length into a continuous data stream without loss of the displaced data bits. The data stream is time delayed while the inserted digital word is processed. Subsequently, the data rate is periodically halved at spaced intervals until the data stream is no longer being delayed and another digital word may be inserted. A reverse process is utilized to extract the inserted digital word without interrupting the processing of data at the receiver, i.e., the data is initially undelayed and is then progressively delayed until sufficient data is available at the receiver to allow continued processing while an inserted digital word is being received. Once the inserted digital word is received in toto, the data input to the receiver is jumped around the inserted digital word to again process undelayed data. The inserted digital word may be parallel transferred into the receiver circuits to effect an update thereof.

30 Claims, 8 Drawing Figures

PATENTED SEP 16 1975

3,906,367

SHEET 3 OF 6

METHOD AND APPARATUS FOR ERROR CORRECTION IN A DIGITAL DATA TRANSMISSION SYSTEM

BACKGROUND OF THE INVENTION

This invention pertains to digital data transmission systems and, more particularly, to an error correction method and apparatus for use with such systems.

Various digital data transmission systems are utilized to avoid the problems associated with transmission of amplitude modulated or frequency modulated signals. One particular method of transmission which is gaining considerable favor is that of incremental or delta modulation in which an incoming amplitude varying information signal is periodically sampled and the amplitude of the sample is compared with a locally stored amplitude of a signal which existed at a previous sample time. If the present amplitude of an incoming signal exceeds the stored amplitude of a previous signal to which it is compared by at least a given quantum, a pulse signal of first loggical significance, commonly designated as "1" is produced as an output of an encoder. If the present amplitude of an incoming signal does not exceed the stored amplitude of a previous signal to which it is compared by at least a given quantum, a signal of second logical significance, commonly designated as a "0," is produced as an output signal. In order to produce compression at the encoder and an inverse expansion at a decoder, a combination of operations generically described as companding, various means have been devised to adjust the amplitude of the quantum to approximate the actually occurring differences between successive sampled amplitudes of the incoming information signal. For a better understanding of a delta modulation encoder and decoder utilizing companding reference may be had to the co-pending application of Hoeschele et al., Ser. No. 361,598 filed May 18, 1973, and assigned to the assignee of the present invention.

In decoding a succession of delta modulated pulses which have been encoded as described above, each incoming logic 1 pulse is caused to add to a local storage or accumulator a quantum corresponding to the quantum employed at the encoder; and each logic 0 pulse is caused to subtract a quantum from the local storage or accumulator. The quantity stored in the accumulator at a given time corresponds at least approximately to the amplitude of the incoming information signal at the encoder. With a fixed value of quantum, there is no problem of tracking between the encoder and the decoder. Noise or interference bursts which simulate pulses from the encoder produce only the equivalent of a shift in a zero reference level at the decoder, which, particularly for voice representations, is tolerable. When the quantum is adjusted, a process referred to as companding, the adjustment may be done responsively to the pattern of the sequence of logic 1 and/or logic 0 signals and may be performed by the same algorithm at the encoder and the decoder. Noise at the decoder may in such case cause a quantum value at the decoder to differ from or, in colloquial terms, fail to track the value at the encoder. Such an error will alter the slope or time rate of change of the decoder output signal from that of the original encoder information signal and so produce distortion rather than mere shift of the reference level. In information signals which frequently fall to substantially zero amplitude, such as voice signals, schemes for adjusting the quantum value at the encoder will ordinarily operate to reduce the quantum to a minimum value, and as a practical matter, the quantum at the decoder will ordinarily be similarly reduced even from an erroneous value different from that of the encoder. For information signals not frequently falling to zero, quantum adjustment may not occur and some special means is desirable to correct the quantum at the decoder to comform to that existing at the encoder. Depending upon the accuracy required in a digitally coded signal, and the severity of the noise interference, it may also be desirable to correct the stored value of the information signal.

The prior art teaches the possibility of interrupting the transmission of the delta modulated information signal to transmit in some fuller code than a single binary pulse signal, either the corrected value of the quantum or the correct amplitude of the information signal or both. One particular prior art teaching is that of transmitting on a time shared basis a supplemental signal which indicates the quantum value employed at the encoder. In general, all the prior art correction methods use up some time bandwidth product, i.e., a certain amount of channel capacity either in derogation of the economy which is an objective of delta modulation or at the expense of an interruption of the flow of information signals whose transmission is the object of any modulation system.

SUMMARY OF THE INVENTION

The present invention provides a means for transmitting an error correction signal in the nature of a supplemental signal indicating the quantum value employed at the encoder, without concurrent interruption of a flow of information signals and without requiring additional channel capacity. Briefly, this result is accomplished by periodically transmitting from an encoder to a decoder a complete digital companding word that exactly defines the present full or partial quantizing step size. To avoid the problem of interrupting digital information signals while inserting an update word into the transmission stream, the subject application is directed to apparatus for effectively delaying and storing data processed out of an encoder while sending out an update word to a decoder. Error correction apparatus is provided at the decoder to delay and store the received bit stream so that when the update word is being transmitted the data which is being processed in the decoder is that which was transmitted several clock times prior to the beginning of the transmission of the update word.

In order to be able to interrupt the data transmission without losing data information, there is provided a shift register connected to receive the data from the encoder and delay the data for a number of clock periods necessary for transmission of an update word. At the end of transmission of the update word, the shift register is completely filled with data. A selective gating or jump circuit connected to receive the outputs from each stage of the shift register then begins to transfer the data from the last stage of the shift register to a modulator for transmission since the last stage is then holding the data bit generated by the encoder immediately after the last data bit which was transmitted prior to transmission of the update word. Thus, no data is lost during insertion of the update word. The jump circuit periodically steps the output taken from the shift register back one stage at a time in such a manner that by the time another update word is to be transmitted, the output from the storage register is being taken from its first stage. During transmission of the next update word, the data from the encoder is again clocked into the storage register and the jump circuit is skipped forward in preparation for transfer of data from the last stage of the storage register and repetition of the above process.

Coordination between the error correction apparatus at the encoder and that at the decoder assures that the same bit being jumped at the encoder will be subsequently jumped at the decoder. This coordination between the encoder and the decoder is accomplished by periodically inserting a sync word into the data stream rather than an update word. The sync word is recognized by error correction apparatus at the decoder and is used to reset all the clock times in the decoder to agree with the clock times in the encoder.

At the decoder the error correction apparatus includes a shift register of sufficient capacity to accommodate a complete update word to assure that once the decoder has processed all the stored data, the shift register is completely filled with an update word. Error correction apparatus at the decoder then recognizes the update word and during a single clock period causes the contents of the shift register at the decoder which has been recognized as an update word to be parallel dumped into a companding counter in the decoder to thereby update the counter to read the same companding word as was previously in the encoder companding counter. The jump circuit is reset and begins transferring data from the first stage of the shift register to the decoder. Since the first stage contains the bit which would have followed the last data bit if no update word has been transmitted, there is no interruption in the delta modulated data stream as far as the decoder is concerned. The incoming delta modulated data stream must now be clocked into the shift register in such a manner as to have it completely filled with data before the time for receiving another update word. This is accomplished by causing the selective gating circuit or jump circuit to periodically step the digital input to the decoder one stage forward into the shift register. The forward jumps are equally spaced in time between the periodic update words; but since data processing is interrupted at that time, no data is lost and the data rate is halved for two clock times at each jump time. The net result is an output which faithfully reproduces the input signal of the encoder transmitter.

DESCRIPTION OF THE PREFERRED EMBODIMENT

As discussed in the "Background of the Invention" above, error correction apparatus of the present invention is used in conjunction with both an encoder and a decoder; however, some differences in construction are required in each. Consequently, the detailed discussion below is divided first into a description of the apparatus used with an encoder and then secondly into a description of apparatus used with a decoder.

Figure 1:
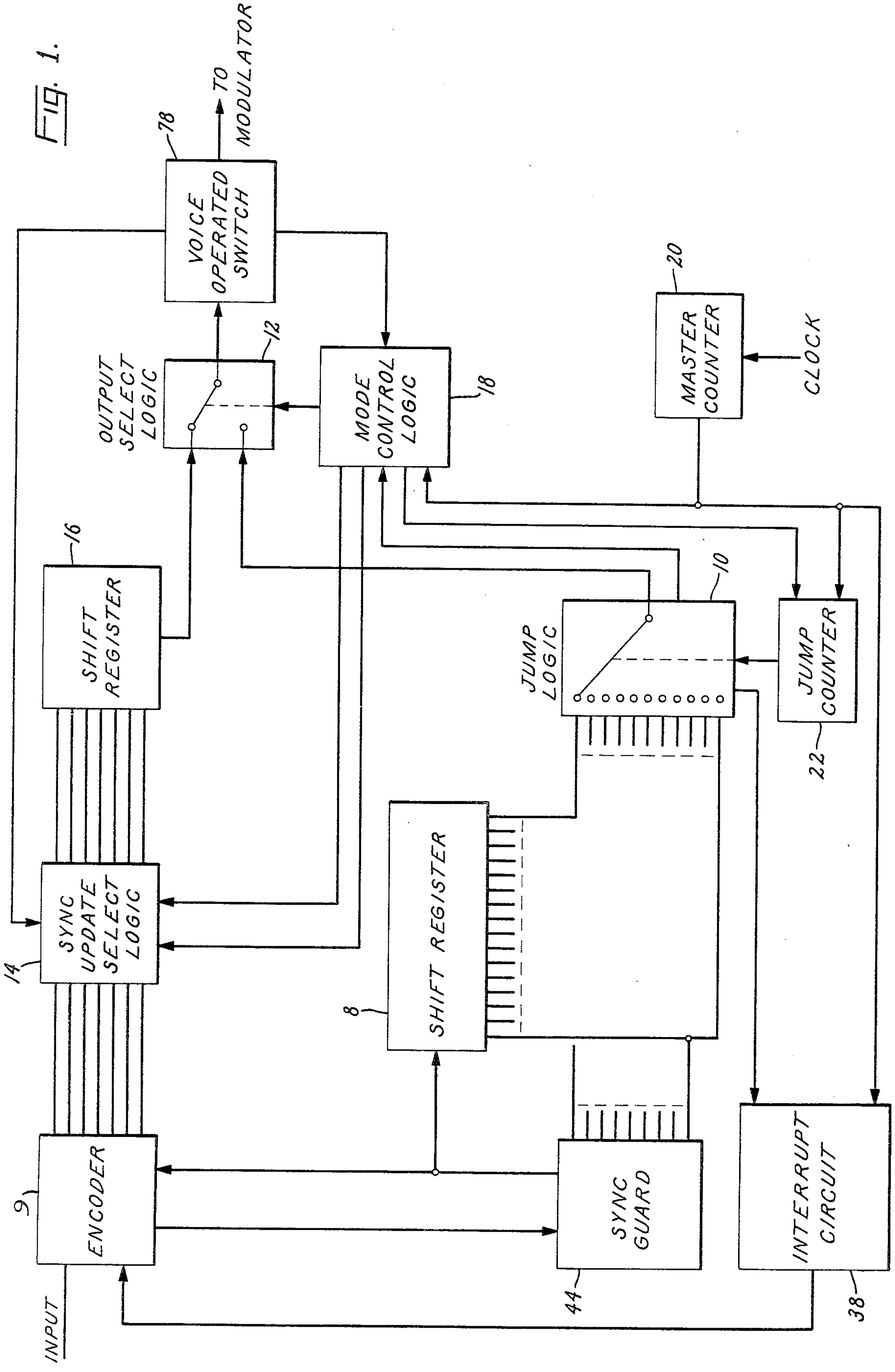
FIG. 1 represents a block diagram of the apparatus of one embodiment of the invention adapted for use with an encoder.

Referring now to the drawings, FIG. 1 shows error correction apparatus of the present invention connected to receive a serial data signal and a companding counter output signal from an encoder in a delta modulation system employing companding techniques. The serial data signal comprises a stream of digital logic signals which would normally be passed to a modulator (not shown) in preparation for transmission. The companding counter output signal, hereinafter referred to as an update word, is a digital word having a plurality of bits and is used in the encoder to define the incremental step size to be added to the contents of a register in the encoder in which is stored a digital number corresponding to the amplitude of a previously sampled signal. In one embodiment of the error correction apparatus of the present invention shown in FIG. 1, the error correction apparatus comprises a first shift register 8 connected to receive the serial data signal from the encoder 9 through a sync guard circuit 44 and a jump circuit 10 connected to receive the output of each stage of shift register 8 in a parallel arrangement. The jump circuit 10 is a digital logic circuit to be more fully described hereinafter which operates to select a single stage of shift register 8 and to transfer the output of the stage of register 8 to an output select logic circuit 12 from whence the digital data signal may be directed into a modulator for transmission. The error correction apparatus further comprises a sync update select logic circuit 14 connected to receive an update word from the encoder 9 and upon receipt of an update signal at predetermined time intervals to parallel transfer the update word to a second shift register 16. Register 16 converts the parallel update word from the encoder 9 into a serial update word which is clocked out of register 16 to output select logic circuit 12. Output select logic circuit 12 is a digital logic circuit controlled by a mode control logic circuit 18. Mode control logic circuit 18 is responsive to a clock signal from a master counter 20 to provide a gating signal to output select logic circuit 12. The gating signal operates to switch the output of output select logic circuit 12 to provide either an output of the shift register 8 or an output of the shift register 16 for selectively connecting the outputs to a modulator. A source of clock pulses (not shown for purposes of clarity) provides clock pulses to both the encoder 9 circuits and the error correction apparatus to assure synchronization.

More specifically, register 8 comprises a digital shift register of a type well known in the art having N stages, where N is a selected number which may, for example, be one unit larger than the number of data bits in an update word. The source of clock pulses of a type well known in the art provides clock pulses to each stage of register 8 to thereby sequentially "clock" the serial data signal from the encoder through register 8. As shown in FIG. 1, each stage of register 8 is connected to one of a plurality of input terminals of jump circuit 10 which selectively transfers the data signal from one stage of register 8 to an output terminal. Selection of a particular stage of register 8 from which data is to be taken by jump circuit 10 is controlled by a jump counter 22 which in turn is controlled by master counter 20.

Figure 2:
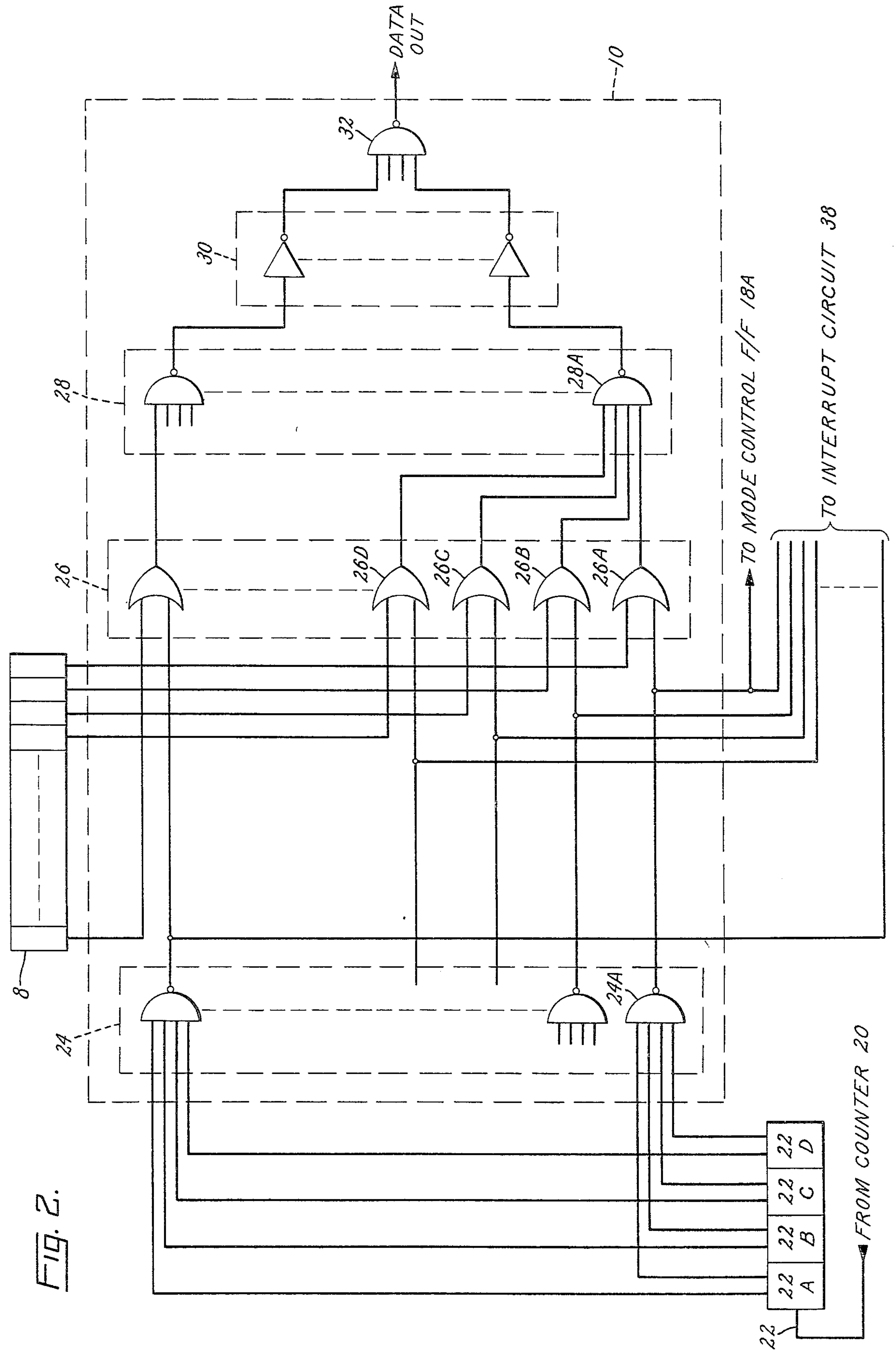
FIG. 2 represents a more detailed block diagram of a stepping or jump circuit shown in FIG. 1.

The operation of jump counter 22 in conjunction with jump circuit 10 is more clearly seen in FIG. 2. Jump counter 22 is a binary counter of a type well known in the art which may comprise, for example, four clocked flip-flops 22A, 22B, 22C and 22D. The outputs of each stage of counter 22 are used as inputs to jump circuit 10 to control the sequential stepping of the outputs of the N stages of register 8.

Clock signals to jump counter 22 are from counter 20 and are generated as a multiple of the system clock signals. For example, in an N stage register requiring N-1 jumps to step sequentially from a first stage to a last stage, jump counter 20 would be clocked N-1 times. Consequently, if M data bits, where $M$ is much greater than $N$, are to be processed during a cycle in which stepping from a first to a last stage of a register is to occur, counter 22 would preferably be clocked every $M \div N$ system clock times. Therefore, clock signals from counter 20 would be produced every $M \div N$ system clock times.

Jump circuit 10 may comprise, for example, a plurality of NAND gates 24 connected to receive inputs from jump counter 22. Counter 22 is connected to NAND gates 24 such that every $M \div N$ clock times a different one of NAND gates 24 is caused to have a logic 0 output. The arrangements of NAND gates 24 is such that the logic 0 output sequentially steps down the series of NAND gates. The output of each of the NAND gates 24 is directed into a first input of a corresponding one of N OR gates 26. A second input to each of the OR gates 26 is from a respective output of one of the N stages of register 8.

The output signals from OR gates 26 are arranged into groups and fed into a plurality of NAND gates 28. Since the output of an OR gate is a logic 1 with a logic 1 input, the only OR gate responsive to an input from register 8 is that one which has a logic 0 input signal from NAND gates 24; hence, all inputs to NAND gates 28 are forced into a logic 1 except for that input from OR gates 26 which has a logic 0 input from NAND gates 24. Under these circumstances, the output of that particular one of OR gates 26 corresponds to the data stored in the stage of register 8 to which that particular one of OR gates 26 is connected. Obviously, the output signal from NAND gate 28 tracks the output signal from that particular one of OR gates 26. The output signals from NAND gates 28 are inverted in inverters 30 and then combined in NAND gate 32. The output of NAND gate 32 when inverted is the data to be processed for transmission and corresponds to the data stored in the particular stage of register 8 selected by jump circuit 10 for transmission.

As an illustrative example of the operation of jump circuit 10 consider the situation wherein the inputs from jump counter 22 to NAND gates 24 are such that NAND gate 24A has a logic 0 output while all other NAND gates 24 have a logic 1 output. The logic 0 output from NAND gate 24A is directed into OR gate 26A. OR gates 26B, 26C, and 26D each have a logic 1 input from a corresponding one of NAND gates 24; consequently, the outputs of these latter three OR gates will be a logic 1 regardless of any other inputs. A second input to each OR gate 26A, 26B, 26C, and 26D is from a corresponding stage of register 8. Since OR gates 26B, 26C and 26D are forced to have a logic 1 output, the input signals from register 8 have no effect on their respective outputs. However, since OR gate 26A has a logic 0 input from NAND gate 24A, the output of OR gate 26A will depend on its input from register 8, i.e., if that stage of register has a logic 0 output, the output of OR gate 26A will be a logic 0 and if that stage of register 8 has a logic 1 output, the output of OR gate 26A will be a logic 1.

When the outputs of OR gates 26A, 26B, 26C, and 26D are combined in NAND gate 28A, the output of this NAND gate will follow the output of the OR gate, e.g., 26A, which has a logic 0 input from NAND gates 24. In the situation illustrated, if the output of OR gate 26A is a logic 0, the output of NAND gate 28A will be a logic 1 whereas if the output of OR gate 26A is a logic 1, the output of NAND gate 28A will be a logic 0. The combining of the outputs of NAND gates 28 in NAND gate 32 is similar to the combining of OR gates 26 in NAND gates 28.

Other means for selecting outputs from particular stages of register 8 will be obvious to those skilled in the art and the above example is set forth illustratively and not in a limiting sense.

Figure 3:
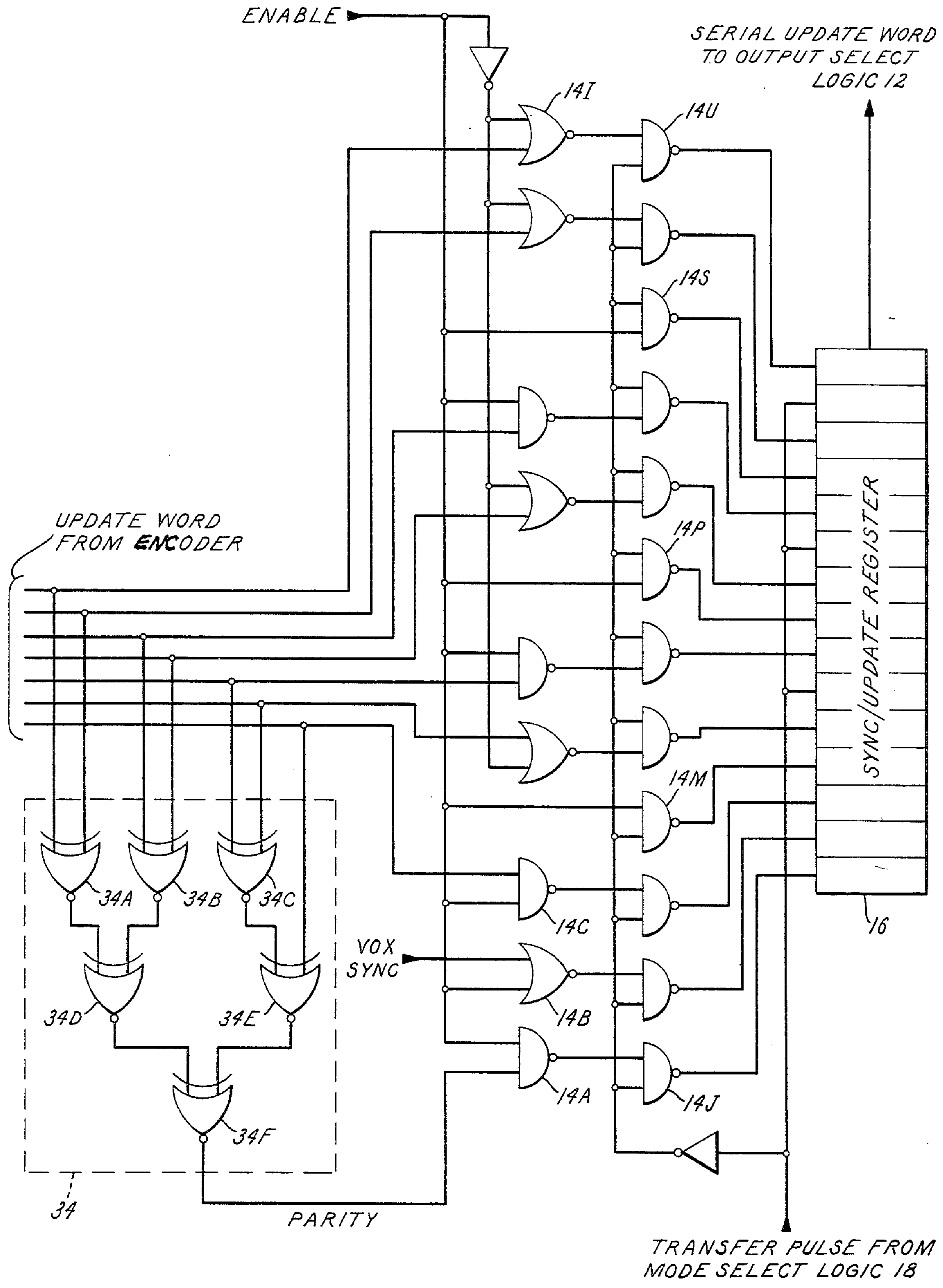
FIG. 3 represents a more detailed block diagram of a sync update select logic arrangement shown in FIG. 1.

Referring now to FIG. 3, the update word from the encoder 9 is controlled by sync update select logic circuit 14 which may comprise, for example, a plurality of NAND and NOR logic gates 14A through 14U although it will be obvious to one skilled in the art that the number of logic gates is related to the number of bits in an update word. Each data bit of the update word, which may comprise for example M bits, where M is a number determined by the maximum incremental step size used in the encoder, is received at a first input of corresponding logic gates 14C through 14I inclusive. Logic gates 14A and 14B are connected to receive a parity bit and a first sync signal, hereinafter referred to as VOX sync, respectively on first inputs. A second input of each of logic gates 14A through 14I is connected to receive an enable signal from sync update select logic, circuit 14.

A parity bit is produced by parity generator 34 connected to monitor the data word from a companding counter in the encoder 9. Generator 34 is of a type well known in the art and may comprise, for example, a plurality of exclusive NOR gates 34A through 34F although it will be obvious that the number of exclusive NOR gates necessary to produce a parity bit is a function of the number of bits in an update word.

Each of the logic gates 14J through 14U has a first input connected to receive a transfer pulse and acts as a plural stage transfer gate. With the exception of logic gates 14M, 14P and 14S, a second input of each of the logic gates 14J through 14U is connected to receive a logic signal from corresponding logic gates 14A through 14I. Logic gates 14M, 14P and 14S have their respective second inputs connected to receive the enable signal.

The outputs of logic gates 14J through 14U are connectd to shift register 16 in such a manner as to provide a logical input signal to corresponding stages of shift register 16. In addition, a plurality of selected stages of register 16 have a logic input connected to receive the transfer pulse rather than a logic signal from output select circuit 14. The transfer pulse is produced by mode control logic circuit 18 in a manner to be more fully described hereinafter.

In operation, receipt of the enable signal allows logic gates 14A through 14I to respond to the input signals on their respective second inputs in a manner well known in the art and to produce output signals which have a logical relationship to the input signals. Selected ones of logic gates 14J through 14U receive the output signals from corresponding ones of logic gates 14A through 14I and in response to the transfer pulse cause the output signals to be loaded into register 16. The update word stored in register 16 is serially clocked from register 16 to output select logic circuit 12.

With continued reference to FIG. 3, register 16 has ($N$—1) stages to thereby produce an ($N$—1) bit update word whereas the update word from the encoder comprises $M$ bits. Although an $M$ bit update word could be utilized, in this embodiment of the invention, it has been found convenient to utilize extra bits in an update word to facilitate identification of the word and reduce the likelihood of bit error in a transmitted word. Consequently, the circuits described above operate to introduce a parity bit as a last bit of an update word and to cause every other bit of the update word to assume a first logical significance, such as, for example, a logic 1.

Although the sync update select logic circuit 14 and register 16 have been described in conjunction with the processing of an update word, the embodiment described will also produce a sync word, that is, a particular pattern of data bits, which may be transmitted in place of an update word. For example, in the absence of an enable signal, the outputs of logic gates 14A through 14I will be of predetermined logical significance. Consequently, if the enable signal is inhibited at the time an update word is to be loaded into register 16, the bits which are clocked into register 16 will be of predetermined logical significance and will generate a word having a predetermined pattern of bits. The sync word is then processed in place of an update word and may be utilized at a receiver for identification or for clock timing.

Figure 4:
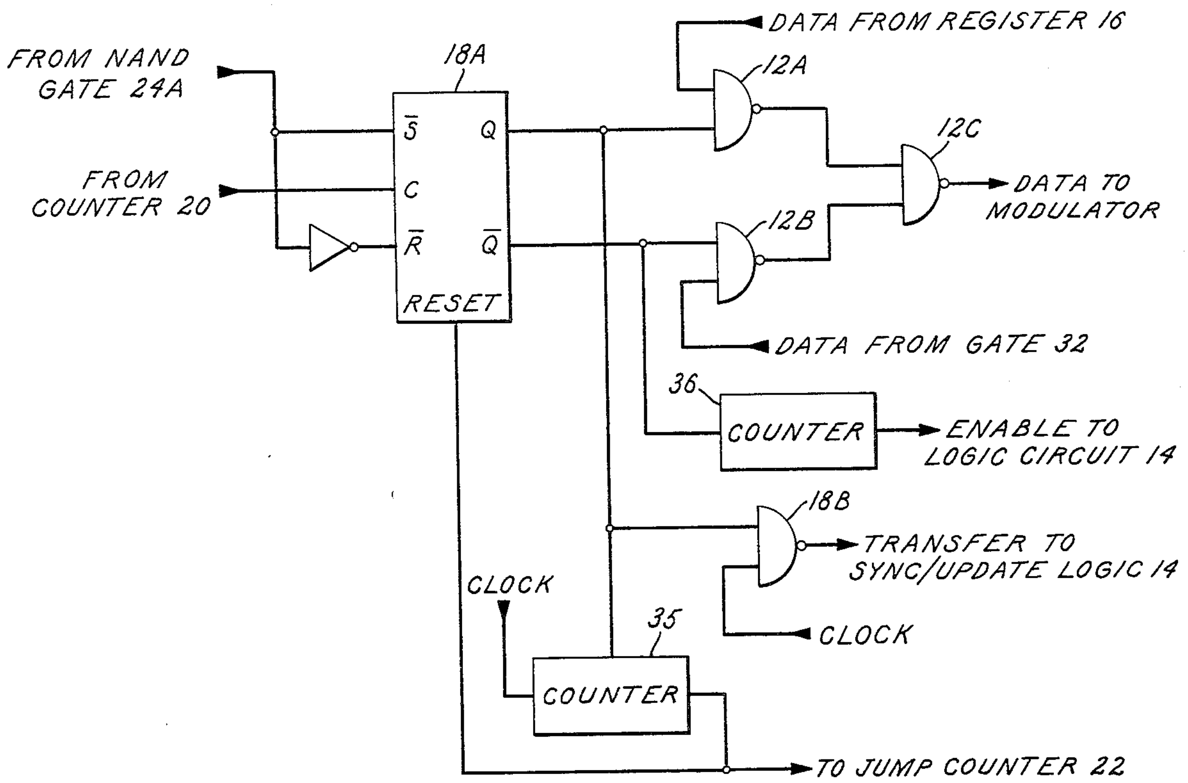
FIG. 4 represents a more detailed block diagram of a mode control logic arrangement shown in FIG. 1.

Referring now to FIG. 4, mode control logic circuit 18 may comprise a flip-flop 18A controlled by a clock signal from counter 20, a RESET signal and a gate signal. The gate signal may be produced by a signal from jump circuit 10 indicating that data from jump circuit 10 is being extracted from the first stage of register 8. The clock signal is generated by summing the outputs from various stages of master counter 20 in a logic gate so that flip-flop 18A is clocked when counter 20 reaches a predetermined count. The SET and RESET outputs of flip-flop 18A control respectively dual input NAND gates 12A and 12B which latter NAND gates in conjunction with NAND gate 12C form output select logic circuit 12. A second input to NAND gate 12A is the serial data output from register 16 and a second input to NAND gate 12B is the serial data output from NAND gate 32 in jump circuit 10. The outputs of NAND gates 12A and 12B are directed into NAND gate 12C and the output from NAND gate 12C becomes the encoder digital output. As can be seen, the state of flip-flop 18A controls whether the output from NAND gate 12C will be from logic gate 32 in jump circuit 10 or from register 16.

A logic signal from flip-flop 18A, shown taken from the Q output in FIG. 4, is combined with a clock signal for timing purposes in NAND gate 18B. The output of NAND gate 18B is utilized as the transfer pulse to initiate loading of register 16. In addition to controlling output select circuit 12, SET and RESET outputs from flip-flop 18A are also used to drive count circuits 35 and 36 which count respectively the number of clock pulses needed to transmit an update word and the number of update words which have been processed since the last sync word. In a typical feedback arrangement the output signal from counter 35 is utilized to control the state of mode control flip-flop 18A, e.g., the output signal from count circuit 35 occurs after $N$—1 clock pulses and is used as the RESET signal to flip-flop 18A. Counter 36 counts the number of times that flip-flop 18A has cycled and maintains the enable signal for a predetermined number of cycles. After the predetermined number of cycles, counter 36 inhibits the enable signal thereby allowing processing of a sync word in place of an update word. Counter 36 is then reset after processing of the sync word and again counts update words while maintaining the enable signal.

In the operation of the circuit shown in FIGS. 1 through 4, jump circuit 10 may be initially set to transfer data bits from the first stage of register 8 to output select logic circuit 12. If the enable signal from counter 36 and the transfer pulse from flip-flop 18A are both present, logic circuit 14 loads the update word into register 16. Since the output of NAND gate 24A is a logic 0, the gate signal is available at flip-flop 18A; hence, upon receipt of a clock signal from counter 20 mode control logic circuit 18 causes the output of output select logic circuit 12 to be switched from the data received from jump circuit 10 to the update word being received from register 16. As the last bit of the update word is clocked through output select logic circuit 12, counter 35 generates an output pulse to reset mode control logic circuit 18 so that flip-flop 18A causes the output from output select logic circuit 12 to be switched from register 16 and back to the output from jump circuit 10. Simultaneously, the output pulse from counter 35 resets jump counter 22 so that jump circuit 10 jumps forward and begins transferring data from the last stage of register 8 rather than from the first stage. As can be seen the data bit stored in the last stage of register 8 and clocked out at the end of the update word is the data bit which would normally have followed the last data bit transmitted prior to the transmission of the update word; consequently, no data is lost as a result of insertion of an update word in the data stream.

Figure 7:
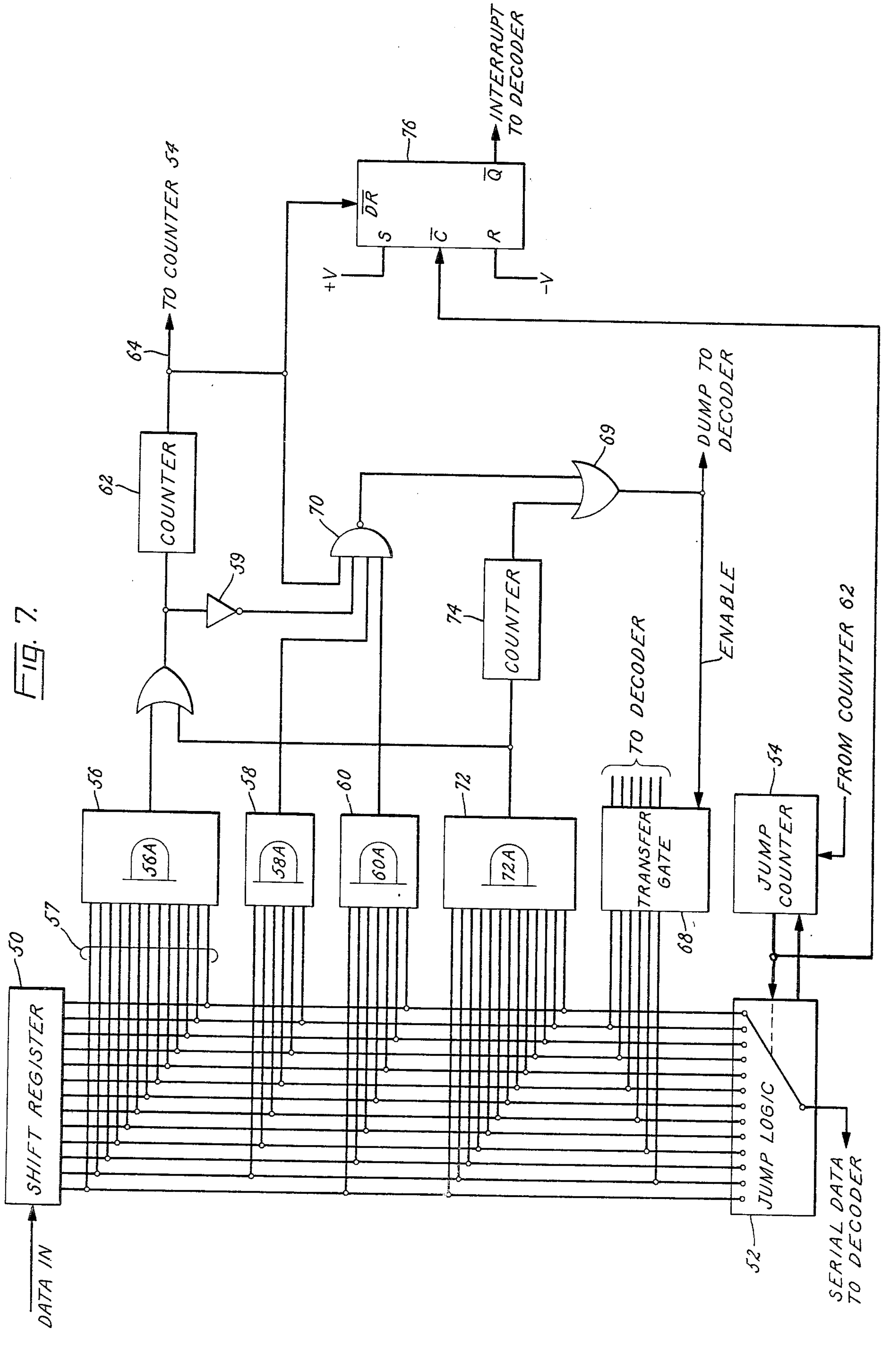
FIG. 7 represents a block diagram of the apparatus of one embodiment of the invention adapted for use with a decoder.

Jump counter 22 provides clock signals causing jump circuit 10 to periodically step in a sequential manner, i.e., in a plurality of steps and a corresponding plurality of time periods from transferring the data bits in the last stage of register 8 to transferring the data bits in the first stage of register 8 and the entire process begins again. An interrupt circuit indicated at 38 in FIG. 1 is provided to interrupt data processing by the encoder during the clock time at which jumping occurs. This has the effect of halving the data rate only at jump time logic monitoring circuits 56, 58, and 60 may be constructed of NAND, NOR, AND, and OR logic gates or of any combination thereof as is well known in the art. As shown in FIG. 7, logic monitoring circuit 56 may comprise in one form thereof an AND gate 56A having inputs from a plurality of stages of register 50. The input lines 57 may be taken from a combination of the output terminals of the various stages of register 50. Hence, when each of the lines 57 presents a logic 1 input to AND gate 56A, the output of AND gate 56A goes to a logic 1 and may be used as a sync signal to reset a counter 62.

In the embodiment described herein, sync and update words are received on a periodic basis. Hence, upon detection of a sync word by monitoring circuit 56 and subsequent resetting of counter 62, it becomes only necessary for counter 62 to count a fixed number of clock times and then to generate an output pulse on line 64 indicating that an update word should now be present in register 50. The output pulse on line 64 is applied to a logic gate 70 which may comprise, for example, a NAND gate which is responsive to all logic 1 inputs. To prevent update on a sync word, an inverted sync signal, i.e., a NOT sync, is developed from the output of logic circuit 56 by inverter 59 and is used as an input to NAND gate 70 to inhibit operation of the update process when a sync word is in register 50.

Monitoring circuit 58 may comprise an AND gate 58A for monitoring certain guard bits having a predetermined logical significance transmitted in alternate sequence between data bits wherein the guard bits are utilized to detect bit error in the transmission process. Monitoring circuit 60 may comprise a parity generator similar to that described in the encoder error correction apparatus. If the guard bits and the parity satisfy the logic requirements of monitoring circuits 58 and 60, the output signals from these circuits are then combined in NAND gate 70 with the output pulse from counter 62 to generate a dump signal to be supplied to the decoder to prepare it for receipt of an update word and to also send an enable signal to transfer gate 68 to allow transfer of the contents of register 50 into the decoder. In the event either the guard bits or the parity bits fail to satisfy the logic requirements of monitoring circuits 58 and 60, the update word is not utilized; however, other circuit operations continue as though the transfer was complete, i.e., jump circuit 52 jumps from the last stage of register 50 to the first stage to start receiving informational data bits as before.

Figure 8:
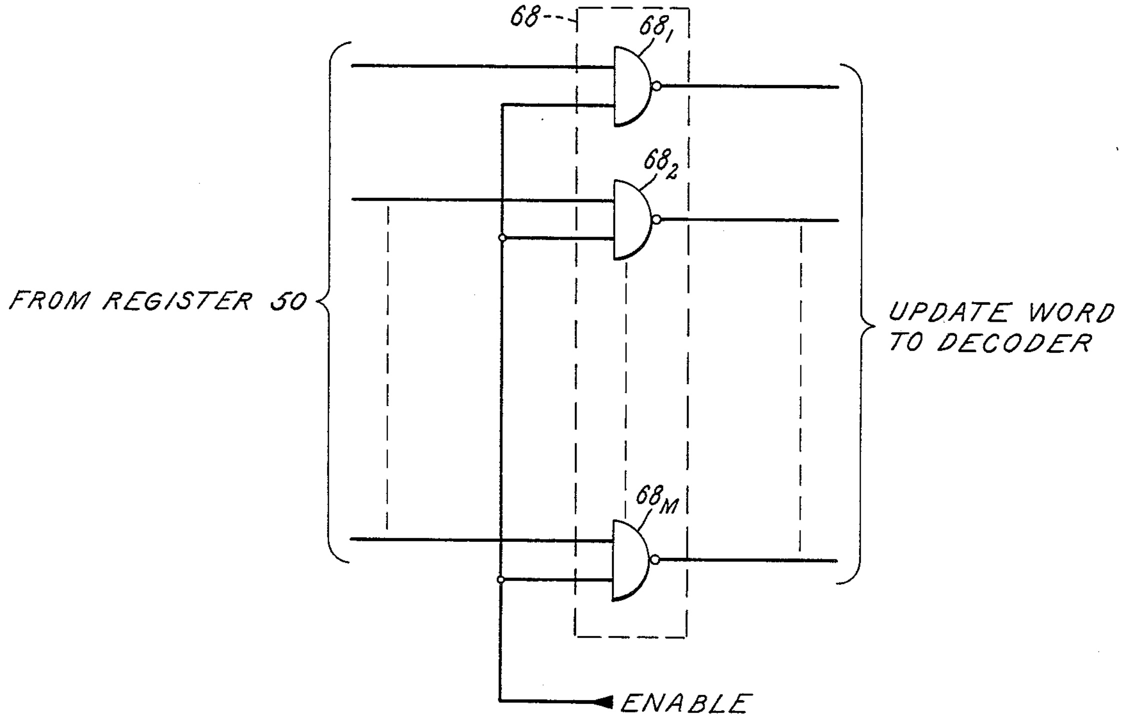
FIG. 8 represents a detailed block diagram of a transfer gate shown in FIG. 7.

As shown in FIG. 7, the M data bits in an update word are gated from register 50 to the decoder through transfer gate 68. Referring to FIG. 8, gate 68 may comprise, for example, a plurality of NAND gates $68_1$ through 68M each having a first input connected to receive a data bit from a corresponding selected stage of register 50. A second input of each of NAND gates $68_1$ through 68M is connected to receive an input signal from NAND gate 70 through OR gate 69. The signal from NAND gate 70 is a logic 1 if and only if its inputs from monitoring circuits 58 and 60 and from counter 62 indicate than an update word is present in register 50 and both guard bits and parity are proper and at the proper time. If the input signal from NAND gate 70 is a logic 1, an enable signal is sent to transfer gate 68 through OR gate 69 and the update word is transferred to the decoder.

The error correction apparatus at the decoder also includes circuitry for providing an interrupt signal to the decoder to inhibit data processing when a data bit is jumped by stepping of jump circuit 52. However, since timing at the decoder is coordinated with timing at the encoder, and since the output signals from the error correction circuitry are processed directly into the decoder, the interrupt circuit need only supply an interrupt signal delayed one clock time after stepping occurs. Thus data processing in the decoder operates at half speed on the same data that was proceeded at half speed in the encoder. In the embodiment shown in FIG. 7, the interrupt signal is generated by a flip-flop 76 which is reset by the output signal from counter 62, that output signal being also used as a clock input to jump counter 54. Hence, flip-flop 76 is reset on the same clock pulse at which jump counter 54 causes jump circuit 52 to step. On the next clock pulse, flip-flop 76 is set thereby producing an output signal delayed one clock time after stepping of jump circuit 52. This output signal is supplied to the decoder as an interrupt signal.

Referring again to FIG. 1, there is shown a voice operated switch (VOX) 78 for disabling data transmission in the absence of an information input signal. Means are provided for affecting an immediate updating process upon detection of an incoming information signal by the VOX. VOX 78 detects the incoming information signal and generates a VOX sync signal to activate the apparatus. The VOX sync signal is directed into sync update select logic circuit 14, and more specifically as shown in FIG. 3 to logic gate 14B. Therefore, a sync word generated during the presence of a VOX sync signal will have one bit which is of different logical significance than the same bit in a normal sync word. The VOX sync signal is also directed into mode control logic circuit 18 to cause immediate transmission of a sync word from register 16. Immediately after transmitting the VOX sync word, rather than begin transmission of an information signal, the VOX sync signal causes the error correction apparatus to begin transmitting an update word by sending an inhibit signal to mode control logic circuit 18 to prevent switching of the output select logic circuit 12 at the end of the VOX sync word. After completion of the transmission of the update word, the operation of the error correction apparatus is the same as was described previously for operation without the voice operated switch.

As will be apparent to those skilled in the art, activation of transmitting and receiving equipment only during data transmission or reception by means such as VOX 78 described above, although theoretically possible on an instantaneous basis, may not be practical. Consequently, as a matter of practice, it may be desirable to initially transmit a sequence of sync words rather than a single sync word prior to transmission of an update word. Such a modification is within the purview of the apparatus described above and since the implementation requires only a minor change to enable a cyclical transmission of a sync word, the implementation will not be described herein.

Referring to FIG. 7, receipt of the VOX sync word in shift register 50 is detected and utilized to initialize timing and prepare the apparatus for immediate receipt of an update word. The VOX sync word in shift register 50 is detected by VOX sync detect circuit 72. Detect circuit 72 generates a VOX signal to start counter 74.

since only one data bit is generated for two clock periods.

Figure 5:
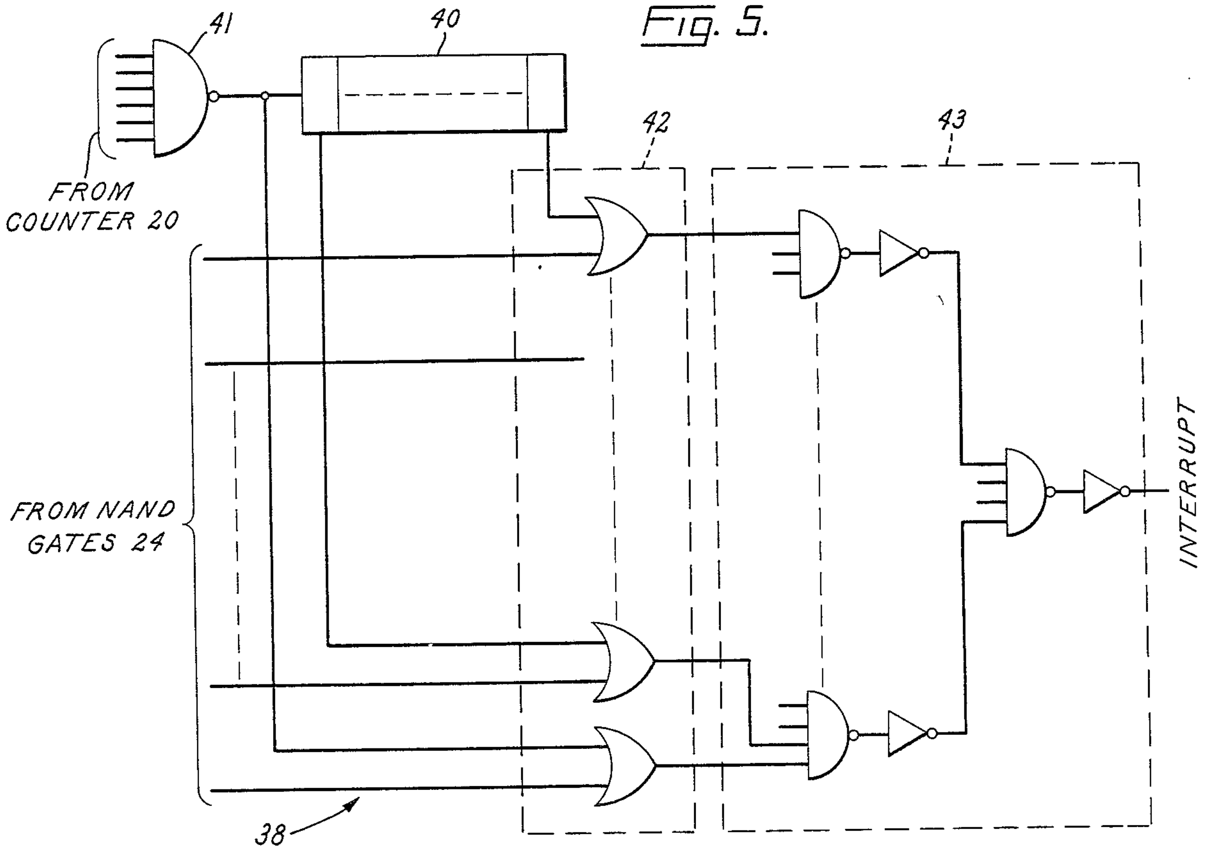
FIG. 5 represents a detailed block diagram of a sliding interrupt pulse generator shown in FIG. 1.

Referring now to FIG. 5, interrupt circuit 38 may comprise, for example, an (*N*—1) stage shift register 40 of a type well known in the art. An input terminal of the first stage is connected to a first input of one of N OR gates 42. An output from each stage is connected to a first input of corresponding ones of the remaining N OR gates 42. Each of the OR gates 42 is also connected to receive a second input from a corresponding one of NAND gates 24. Register 40 is triggered by an input signal from master counter 20 which is generated by combining the outputs of several stages of counter 20 in a NAND gate 41 so that register 40 may be preset to start shifting at a predetermined clock time. As will be obvious from the previous discussion of jump counter 10, one of OR gates 42 will be receiving a logic 0 from one of NAND gates 24 and the logic 0 will be indicative of the particular stage of register 8 from whence data is being transferred for transmission purposes. Consequently, as register 40 is sequentially clocked, a logic 0 will sequentially appear at the first input of each of OR gates 42. When the logic 0 from register 40 is coincidental with a logic 0 from NAND gates 24 in a particular one of OR gates 42, that OR gate will produce a logic 0 output. The output signals from OR gates 42 are combined in a logic circuit 43 similar to the logic combining circuit comprising logic gates 28, 30 and 32 described in conjunction with jump circuit 10. The logic 0 output from any one of OR gates 42 will therefore produce an interrupt signal which is used to inhibit the encoder from acting on the data bit occurring at that clock time.

Interrupt circuit 38 provides an interrupt signal which occurs one clock time later with respect to each step of jump circuit 10. This changing or sliding time relationship is required since the data bit which is jumped by stepping of jump circuit 10 occurs one clock time later in the encoder 9 as jump circuit 10 steps from the last stage of register 8 toward the first stage.

In an embodiment of the invention wherein a sync word having a predetermined pattern of bits is periodically inserted in the data stream in place of an update word, there is provided a logic circuit, such as sync guard circuit 44, to monitor the data word in register 8. If the pattern of data bits in register 8 starts to assume a pattern corresponding to the predetermined pattern selected to identify a sync word, sync guard circuit 44 interrupts the data processing in the encoder and substitutes therefor a pattern of bits distinctive from the predetermined pattern used to identify a sync word.

Figure 6:
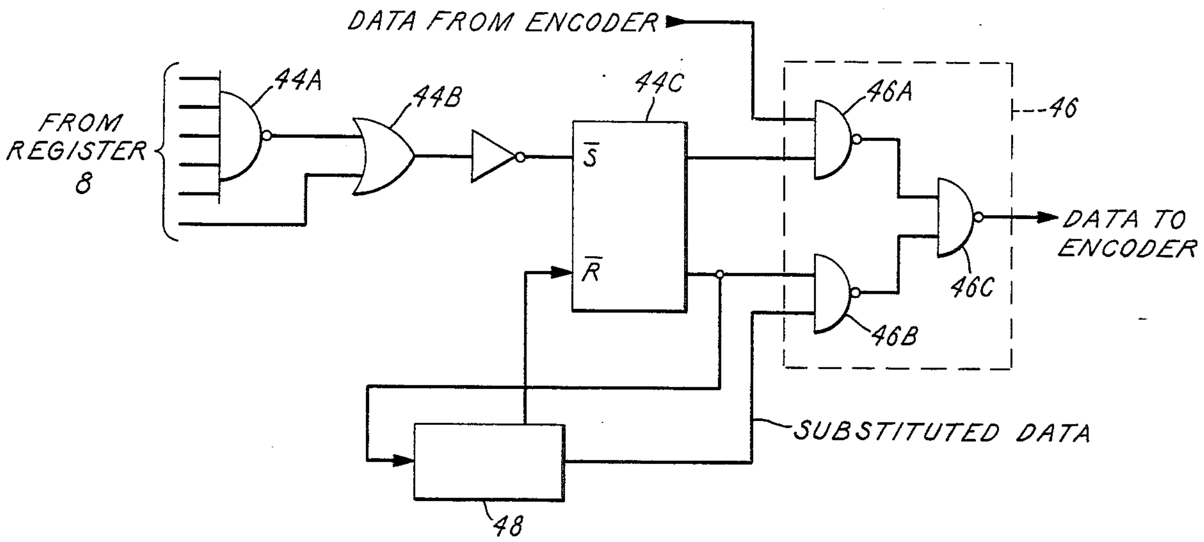
FIG. 6 represents a detailed block diagram of a sync guard circuit shown in FIG. 1.

With reference to FIG. 6, sync guard circuit 44 may comprise, for example, a NAND gate 44A and an OR gate 44B connected to receive selected inputs from register 8 and to provide an output signal from OR gate 44B when the selected inputs assume a predetermined logical significance. The output signal is then used to SET flip-flop 44C. The outputs from flip-flop 44C are connected to a logic switch 46 and to a plural stage counter 48.

Logic switch 46 comprises a plurality of NAND gates 46A, 46B and 46C. NAND gate 46A is connected to receive a first logic signal from flip-flop 44C and the serial data signal from the encoder 9. When the logic signal from flip-flop 44C is a logic 1, the output of NAND gate 46A tracks the serial data signal from the encoder

9; however, when the logic signal from flip-flop 44C is a logic 0, the output of NAND gate 46A is forced to a logic 1. NAND gate 46B operates similarly, however, a second input to NAND gate 46B is from counter 48. Consequently, when the outputs of NAND gates 46A and 46B are combined in NAND gate 46C, the output of NAND gate 46C becomes either the serial data signal or substituted data signal as a function of the state of flip-flop 44C. An output from the last stage of counter 48 is used to RESET the flip-flop 44C to again allow passage of the serial data signal through switch 46.

The error correction apparatus for use with a decoder in a delta modulation receiver utilizing companding techniques is constructed along the basic concepts discussed above for error correction apparatus used in an encoder 9. specifically, and with reference to FIG. 7, decoder error correction apparatus comprises a shift register 50 connected to receive a digital input signal and a jump circuit 52 connected to receive an output from each stage of register 50. Jump circuit 52 operates as did jump circuit 10 described previously in conjunction with an encoder to selectively gate the data from a single stage of register 50 to form a serial data output which is then directed into the decoder. Jump counter 54 provides clock pulses to jump circuit 52 to cause sequential stepping of the jump circuit from stage to stage of register 50.

Jump circuit 52 operates in a manner identical to jump circuit 10 except that where jump circuit 10 begins taking data from the last stage of register 8 and sequentially steps back to the first stage, jump circuit 52 begins taking data from the first stage of register 50 and sequentially steps forward to the last stage. This distinction in operation is necessitated by the fact that the decoder must still be processing informational data bits while the error correction apparatus is receiving an update or a sync word. Thus, jump circuit 52 is programmed to be extracting data bits from the last stage of register 50 when the first bit of an update or sync word is being received in the first stage of register 50; therefore, when the last informational data bit is extracted from the last stage of register 50, register 50 will then be completely filled with a sync or update word.

The sync or update word is parallel dumped from register 50 during a single clock time while simultaneously jump circuit 52 jumps from the last stage of register 50 to the first stage to pick up the first informational data bit which was received immediately after the last bit of the sync or update word. Jump counter 54 then begins to periodically step jump circuit 52 forward so that at the time when a new sync or update word is again being received in register 50, the information data bits are once more being taken from the last stage of register 50.

Although a received update word could include a particular pattern of data bits which would allow a logic circuit in the decoder error correction apparatus to recognize an update word as such, in one embodiment of the present invention it has been found convenient to utilize a separate sync word and a separate update word. Consequently, there is provided a plurality of logic monitoring circuits 56, 58 and 60 each connected to monitor the contents of selected stages of register 50. For any predetermined pattern of data bits which might be used to identify a sync or update word, the Counter 74 counts N clock times, where N is the number of stages in register 50, and then generates an enable signal which is sent through OR gate 69 to enable transfer gate 68 to cause parallel transfer of the update word stored in register 50 into the decoder again only if parity and guard bits are verified. Once the decoder has been updated by the update word from register 50, operation of the error correction apparatus in the decoder proceeds as was previously described, i.e., the jump circuit causes the data being sent to the decoder to be taken from the first stage of register 50 which now contains the first informational data bit transmitted immediately after completion of transmission of the update word.

Commercially available integrated circuit units provide shift registers, counters, OR gates, AND gates, and complemented gates referred to as NOR gates and NAND gates. For the purpose of description of the manner of operation of the invention, a combination of complemented and non-complemented logic gates have been described; however, the manner of employing such devices to perform the logical operations included herein is part of the well known art and the use of a particular logic device is not to be considered a limiting embodiment.

It is also part of the known art that the application of clock pulses to certain components may have to be delayed, particularly in high speed operation, to permit other components to change their state or condition. Since the delay required in any given case will be a function of the speed of operation of the components employed, it is not possible to specify these delays, the provision of which is part of the known art.

What is claimed as new and desired to be secured by Letters Patent of the United States is:

1. Error correction apparatus comprising:

a. a source of clock pulses;

b. a first clocked delay and storage means connected to receive incoming digital logic signals, said delay and storage means including *N* output terminals wherein said incoming digital logic signals may be detected at each of said output terminals at a different delay time;

c. a first clocked logic circuit having a plurality of input terminals and an output terminal, said input terminals being connected to corresponding ones of said output terminals of said delay and storage means, said first clocked logic circuit being responsive to said clock pulses to selectively transfer said incoming digital logic signals from one of said input terminals to said output terminal;

d. a second clocked logic circuit having a plurality of input terminals and a plurality of output terminals, said second clocked logic circuit connected to receive a parallel digital word on said input terminals and being responsive to a first predetermined number of said clock pulses to parallel transfer said parallel digital word to said output terminals;

e. a second clocked delay and storage means having a plurality of input terminals and an output terminal, said input terminals being connected to receive said parallel digital word from said second clocked logic circuit, said second clocked delay and storage means being responsive to said clock pulses to convert said parallel digital word to a serial digital word at said output terminal;

f. a third clocked logic circuit having first and second input terminals and an output terminal, said third clocked logic circuit being connected to receive said serial digital word from said output terminal of said second clocked delay and storage means on said first input terminal and connected to receive said digital logic signals from said data output terminal of said first clocked logic circuit on said second input terminal, said third clocked logic circuit being responsive to said first predetermined number of said clock pulses to transfer said serial digital word from said first input terminal to said output terminal and being responsive to a second predetermined number of said clock pulses to transfer said digital logic signals from said second input terminal to said output terminal.

2. The apparatus as defined in claim 1 wherein said delay and storage means comprises a digital shift register.

3. The apparatus as defined in claim 1 wherein said first clocked logic circuit comprises:

a. first resettable counter means connected to receive said clock pulses and to produce count pulses in response thereto;

b. a first plurality of *N* logic gates connected to receive count pulses from said counter and being responsive thereto to provide at a given clock time *N*-1 output signals of first logical significance and one output signal of second logical significance, said output signal of second significance being caused to sequentially step through said first plurality of *N* logic gates;

c. a second plurality of *N* logic gates each having first and second input terminals and an output terminal, each of said second plurality of *N* logic gates being connected to receive said incoming digital logic signals from corresponding ones of said *N* output terminals of said first clocked delay and storage means on said first input terminal and connected to receive said output signals from corresponding ones of said first plurality of *N* logic gates on said second input terminal, and wherein said second plurality of *N* logic gates are responsive to said signal of said second logical significance on said second input terminal to pass said incoming digital logic signals on said first input terminal to said output terminal d. logic means connected to receive said incoming digital logic signals from said output terminals of each of said second plurality of N logic gates and effective to transfer said incoming digital logic signals to said data output terminal.

4. The apparatus as defined in claim 1 wherein said second clocked logic circuit comprises:

a. second resettable counter means connected to receive said clock pulses and responsive to said first predetermined number of said clock pulses to produce an output signal of said first logical significance;

b. a first plurality of logic gates each having first and second input terminals and an output terminal, each of said logic gates being connected to receive one bit of said parallel digital word on corresponding ones of said first input terminals and connected to receive said output signal from said counter means on said second input terminal, each of said logic gates being responsive to said output signal from said counter means of first logical significance to transfer said bits of said parallel digital word to said output terminal.

5. The apparatus as defined in claim 1 wherein there is provided a fourth logic circuit connected to receive output signals from selected ones of said output terminals of said first clocked delay and storage means, said fourth logic circuit being responsive to a first predetermined pattern of said output signals to interrupt said incoming digital logic signals and substitute therefor a second predetermined pattern of logic signals.

6. The apparatus as defined in claim 4 and wherein there is provided means for inserting a predetermined pattern of bits into said parallel digital word, said means comprising:

a. a second plurality of logic gates each having first and second input terminals and an output terminal, said second plurality of logic gates being greater in number than said first plurality of logic gates, first selected ones of said second plurality of logic gates being connected to receive said bits on said first input terminals from said output terminals of corresponding ones of said first plurality of logic gates, second selected ones of said second plurality of logic gates being connected to receive said output signal from said counter means on said first input terminals and wherein each of said first and second selected ones of said second plurality of logic gates are responsive to a transfer signal to transfer said output signals to said output terminals of said second plurality of logic gates wherein said parallel digital word has interspersed therein a plurality of data bits of predetermined logical significance.

7. The apparatus as defined in claim 6 wherein each of said first and second plurality of logic gates has an output signal of predetermined logical significance in the absence of said output signal of first logical significance from said counter means such that said output signals of said first and second plurality of logic gates comprise a sync word having a predetermined pattern of bits, and including means for periodically inhibiting said output signal from said counter means and transferring said sync word to said output terminals of said second clocked logic circuit in place of said parallel digital word.

8. The apparatus as defined in claim 7 further including means for transmitting a sync word followed immediately by a parallel digital word upon activation of said apparatus, said means comprising:

a. a fifth logic circuit connected to receive said digital logic signals, said fifth logic circuit including means to detect said digital logic signals and being responsive thereto to produce output pulse coincident with receipt of said digital logic signals;

b. said third clocked logic circuit including first means connected to receive said output pulse from said fifth logic circuit and responsive thereto to transfer said serial digital word from said first input terminal of said third clocked logic circuit to said output terminal of said third clocked logic circuit and further including means for inhibiting said output signal from said counter means and means for producing a logic signal to cause transfer of said sync word into said second delay and storage means;

c. said third clocked logic circuit including second means connected to receive said output pulse from said fifth logic circuit and responsive thereto to be preset to a predetermined number of clock pulses wherein said predetermined number is a function of said time period required for transmission of a sync word, said second means being clocked coincidental with said second delay and storage means such that said second means produces an output pulse coincidental with the last bit of said sync word; and d. said third clocked logic circuit including third means connected to receive said output pulse from said second means and responsive thereto to set said apparatus to a condition for transmission of said parallel digital word.

9. The apparatus as defined in claim 8 and wherein there is provided means for producing an interrupt signal to be supplied to an encoder at a time when said encoder would be processing a data bit which will subsequently be jumped by stepping of said first clocked logic circuit thereby halving the data rate for two clock periods, said means comprising:

a. a first logic means connected to receive said clock pulses and responsive thereto to produce an output pulse;

b. a shift register having an input terminal and a plurality of output terminals, said input terminal being connected to receive said output pulse, said shift register being responsive to said clock pulses to sequentially clock said output pulse to each of said output terminals;

c. a plurality of logic gates each having first and second input terminals and an output terminal, each of said plurality of logic gates being connected to receive said output pulse from corresponding ones of said output terminals of said shift register on said first input terminal and connected to receive said output signals from corresponding ones of said first plurality of $N$ logic gates of said first clocked logic circuit on said second input terminal, and wherein each of said plurality of logic gates is responsive to said signal of said second logical significance on said second input terminal to pass said output pulse on said first input terminal to said output terminal; and d. a logic circuit connected to receive said output pulse from said output terminal of each of said plurality of logic gates and responsive thereto to produce said interrupt signal.

10. In a delta modulation transmission system including an encoder for produced an encoded digital output signal and utilizing companding techniques in which a digital word is used for incremental stepsize adjustment, the improvement which comprises means for inserting said digital word into said digital output signal, said means comprising:

a. a first clocked delay and storage means connected to receive said digital output signal from said encoder, said clocked delay and storage means including $N$ output terminals wherein said digital output signal may be detected at each of said output terminals at different delay times;

b. a first clocked logic circuit including $N$ input terminals and an output terminal, said input terminals being connected to corresponding ones of said $N$ output terminals of said first clocked delay and storage means, said first clocked logic circuit being responsive to a first predetermined number of clock pulses to selectively transfer said digital output signal from one of said N input terminals to said output terminal;

c. a second clocked logic circuit including a plurality of input terminals and a plurality of output terminals, said second clocked logic circuit being connected to receive said digital word from said encoder and being responsive to a second predetermined number of said clock pulses to parallel transfer said digital word to said output terminals;

d. a second clocked delay and storage means including a plurality of input terminals and an output terminal, said input terminals being connected to corresponding ones of said output terminals of said second clocked logic circuit for receiving said digital word, said second clocked delay and storage means being responsive to said clock pulses to serially transfer said digital word to said output terminal; and e. a third clocked logic circuit including a first and a second input terminal and an output terminal, said first input terminal being connected to said output terminal of said second clocked delay and storage means and said second input terminal being connected to said output terminal of said first clocked logic circuit, said third clocked logic circuit being responsive to said first and second predetermined number of clock pulses respectively to selectively connect said first and second input terminals to said output terminal.

11. The system as defined in claim 10 wherein said clocked delay and storage means comprises a digital shift register.

12. The system as defined in claim 10 wherein said first clocked logic circuit comprises:

a. a resettable counter connected to receive said clock pulses and to provide a plurality of output count pulses;

b. a first plurality of *N* logic gates connected to receive said count pulses from said counter and being responsive thereto to provide *N*—1 output signals of first logical significance and one output signal of second logical significance wherein said output signal of second logical significance is caused to sequentially step through said first plurality of *N* logic gates;

c. a second plurality of *N* logic gates each having first and second input terminals and an output terminal, each of said first input terminals being connected to receive said digital output signals from a corresponding one of said *N* output terminals of said first clocked delay and storage means, each of said second input terminals being connected to receive said output signals from corresponding ones of said first plurality of *N* logic gates wherein said second plurality of *N* logic gates are responsive to said output signal of second logical significance to transfer said digital output signal on said first input terminal to said output terminal; and d. a logic circuit connected to receive said digital output signal from said output terminal of each of said second plurality of *N* logic gates and to transfer said digital output signal to said output terminal of said first clocked logic circuit.

13. The apparatus as defined in claim 10 wherein said second clocked logic circuit comprises:

a. resettable counter means connected to receive said clock pulses and responsive to said first predetermined number of said clock pulses to produce an output signal of first logical significance;

b. a plurality of logic gates each having first and second input terminals and an output terminal, each of said logic gates being connected to receive one bit of said digital word from said companding counter on corresponding ones of said first input terminals and connected to receive said output signal from said counter means on said second input terminal, each of said logic gates being responsive to said output signal from said resettable counter means of first logical significance to transfer said bits of said digital word to said output terminals.

14. The apparatus as defined in claim 10 further including a fourth logic circuit connected to receive output signals from selected ones of said output terminals of said first clocked delay and storage means, said fourth logic circuit being responsive to a first predetermined pattern of said output signals to interrupt said incoming digital to logic signals and substitute therefore a second predetermined pattern of logic signals.

15. The apparatus as defined in claim 13 and wherein there is provided means for inserting a predetermined pattern of bits into said digital word, said means comprising:

a. a second plurality of logic gates each having first and second input terminals and an output terminal, said second plurality being greater in number than said first plurality of logic gates, first selected ones of said second plurality of logic gates being connected to receive said output signals on said first input terminal from said output terminals of corresponding ones of first plurality of logic gates, second selected ones of said second plurality of logic gates being connected to receive said output signal from said counter means on said first input terminal and wherein each of said first and second selected logic gates is responsive to a transfer signal to transfer said output signals to said output terminals wherein said digital word has interspersed therein a plurality of data bits of predetermined logical significance.

16. The apparatus as defined in claim 15 and wherein each of said first and second plurality of logic gates has an output signal of predetermined logical significance in the absence of said output signal of first logical significance from said counter means such that said output signals comprise a sync word having a predetermined pattern of bits and said apparatus includes means for periodically inhibiting said output from said counter means and transferring said sync word to said output terminals of said second clocked logic circuit in place of said digital word.

17. The apparatus as defined in claim 16 and wherein there is provided means for transmitting a sync word followed immediately by a digital word upon activation of said apparatus, said means comprising:

a. a fifth logic circuit connected to receive said digital output signal, said fifth logic circuit including means for producing an output pulse coincident with receipt of said digital output signal;

b. first means in said clocked logic circuit connected to receive said output pulse from said fifth logic circuit and responsive thereto to transfer said digital word from said first input terminal to said output terminal and further including means for inhibiting said output signal from said counter means and means for producing a logic signal to cause transfer of said sync word into said second delay and storage means;

c. second means in said third clocked logic circuit connected to receive said output pulse from said fifth logic circuit and responsive thereto to be preset to a predetermined number of clock pulses wherein said predetermined number is a function of said time required for transmission of a sync word, said second means being clocked coincidentally with said second delay and storage means such that said second means produces an output pulse coincidental with a last bit of said sync word; and d. third means in said third clocked logic circuit connected to receive said output pulse from said second means and responsive thereto to set said apparatus to a condition for transmission of said digital word.

18. The apparatus as defined in claim 17 and wherein there is provided means for producing an interrupt signal to be supplied to said encoder at a time when said encoder would be processing a data bit which will subsequently be jumped by stepping of said first clocked logic circuit thereby halving the data rate for two clock periods, said means comprising:

a. a first logic means connected to receive said clock pulses and responsive thereto to produce an output pulse;

b. a shift register having an input terminal and a plurality of output terminals, said input terminal being connected to receive said output pulse, said shift register being responsive to said clock pulses to sequentially clock said output pulse to each of said output terminals;

c. a plurality of logic gates each having first and second input terminals and an output terminal, each of said plurality of logic gates being connected to receive said output pulse from corresponding ones of said output terminals of said shift register on said first input terminal and connected to receive said output signals from corresponding ones of said first plurality of $N$ logic gates of said first clocked logic circuit on said second input terminal, and wherein each of said plurality of logic gates is responsive to said signal of said second logical significance on said second input terminal to pass and output pulse on said first input terminal to said output terminal; and d. a logic circuit connected to receive said output pulse from said output terminal of each of said plurality of logic gates and responsive thereto to produce said interrupt signal.

19. The method for inserting a data word into a periodically digitally encoded data signal comprising the steps of:

a. delaying and storing the periodically digitally encoded data signal for a first discrete number of periods while transmitting said inserted data word;

b. transmitting said delayed periodically digitally encoded data signal after completion of transmission of said inserted data word;

c. at each of a plurality of steps reducing the first discrete number of periods by a second discrete number of periods less than the said first number and at the same time interrupting the digital encoding of the data signal for the second discrete number of periods.

20. The method for inserting a data word into a digitalized information signal without concurrent loss of the digitalized information which would normally occupy the time period now occupied by the data word, comprising the steps of:

a. delaying the digitalized information signal for a time period equal to the length of time necessary for transmission of the data word by storing said digitalized information signal in a digital storage register;

b. transmitting from the last stage of said digital storage register the delayed digitalized information signal after completion of transmission of said inserted data word;

c. sequentially stepping between predetermined time intervals from said last stage of said digital storage register to the first stage of said digital storage register such that at the end of $N$ time intervals, where $N$ is the number of data bits in said inserted data word, the digitalized information signal being transmitted is being taken from the first stage of said digital storage register, and at the same time interrupting the digitization of the information signal for a time equal to the reduction in delay time produced by each said sequential step.

21. The method for updating a decoder in a delta modulation system of the type including an encoder for producing a digital output signal, said method comprising the steps of:

a. delaying and storing said digital output signal from said encoder prior to transmission;

b. transmitting in place of said digital output signal a data word of $N$ bits defining a paramter of said encoder;

c. transmitting said delayed digital output signal after completion of transmission of said data word;

d. progressing by a plurality of steps from transmitting the most delayed digital output signal to transmitting the least delayed digital output signal in such a manner that no digital output signals are lost;

e. receiving said digital output signal and said inserted data word at said decoder;

f. delaying and storing said digital output signal and said inserted data word for a time interval at least equal to the time interval required to receive a complete data word;

g. transferring said digital output signal from a most delayed position into said decoder;

h. detecting the presence of a complete data word;

i. transferring in parallel manner said complete data word into said decoder;

j. jumping from transferring said data signal from said most delayed position to transferring said data signal from a least delayed position into said decoder; and k. progressively shifting the transfer of said digital output signal in a plurality of steps from said least delayed position to said most delayed position.

22. The method as defined in claim 21 wherein a sync word having a predetermined pattern of data bits is periodically inserted in place of a data word and wherein said sync word is utilized to synchronize clock times at said decoder with those at said encoder.

23. The method as defined in claim 21 further including interrupting data processing in said encoder at a time when each of said single bits being jumped by stepping is being processed by said encoder such that the data rate is halved.

24. Apparatus for extracting a data word of *N* bits from a serial data signal, said apparatus comprising:

a. a source of clock pulses;

b. clocked delay and storage means connected to receive incoming digital logic signals, said delay and storage means including *N* output terminals wherein said incoming digital logic signals may be detected at each of said output terminals at a different delay time;

c. a first clocked logic circuit having a plurality of input terminals and an output terminal, said input terminals being connected to corresponding ones of said output terminals of said delay and storage means, said first clocked logic circuit being responsive to said clock pulses to selectively transfer said incoming digital logic signals from one of said input terminals to said output terminal; and d. a second clocked logic circuit having a plurality of input terminals and a plurality of output terminals, said input terminals being connected to selected ones of said output terminals of said clocked delay and storage means wherein said second clocked logic circuit is responsive to a predetermined number of said clock pulses to transfer output signals from said selected ones of said output terminal of said clocked delay and storage means to said output terminals of said second clocked logic circuits.

25. The apparatus as defined in claim 24 and including a monitoring circuit connected to receive output signals from selected ones of said output terminals of said clocked delay and storage means, said monitoring circuit providing first, second and third output signals in response to first, second and third predetermined patterns of output signals and respectively from said clocked delay and storage means and wherein said first output signal is effective to reset timing means controlling said first and said second logic circuits and wherein said second and third output signals occur coincidentally with said predetermined number of clock pulses and are effective to cause transfer of said output signals from selected ones of said output terminals of said clocked delay and storage means to said output terminals of said second clocked logic circuit.

26. In a delta modulation receiver including a decoder employing companding techniques, the improvement comprising:

a. clocked delay and storage means connected to receive digital data signals, said clocked delay and storage means including *N* output terminals for detecting said digital data signals at different delay times;

b. a first clocked logic circuit having *N* input terminals and an output terminal, said input terminals being connected to corresponding ones of said output terminals of said clocked delay and storage means, said first clocked logic circuit being responsive to a first predetermined number of clock pulses to selectively transfer said digital data signals from one of said input terminals to said output terminal of said first clocked logic circuit and wherein said decoder is connected to receive said digital data signal from said output terminal;

c. a second clocked logic circuit having a plurality of input terminals and a plurality of output terminals, said input terminals being connected to selected ones of said output terminals of said clocked delay and storage means for receiving selected bits of said digital data signal, said second clocked logic circuit being responsive to a second predetermined number of clock pulses to parallel transfer said selected bits of said digital data signal to said output terminals of said second clocked logic circuit and wherein said decoder is connected to be updated by said parallel selected bits; and d. means responsive to said second predetermined number of clock pulses for resetting said clocked delay and storage means to an initial state.

27. The improvement as defined in claim 26 and further comprising:

a. a monitoring circuit connected to receive output signals from selected ones of said output terminals of said clocked delay and storage means, said monitoring circuit providing first, second and third output signals in response to first, second and third predetermined patterns of output signals respectively from said clocked delay and storage means;

b. logic means connected to receive said first, second and third output signals and wherein said first output signal is effective to reset timing means controlling said first and said second logic circuits and wherein said second and third output signals occur coincidentally with said predetermined number of clock pulses and are effective to cause transfer of said output signals from selected ones of said output terminals of said clocked delay and storage means to said output terminals of said second clocked logic circuit.

28. The improvement as defined in claim 27 wherein said monitoring circuit comprises:

a. a third logic circuit connected to monitor said output terminals of said clocked delay and storage means for the presence of said first predetermined pattern of bits and being responsive thereto to initiate resetting of timing means controlling said first and second clocked logic circuits;

b. a fourth logic circuit connected to monitor selected output terminals of said clocked delay and storage means for the presence of said second predetermined pattern of bits and being responsive thereto to produce a parity bit;

c. a fifth logic circuit connected to monitor selected output terminals of said clocked delay and storage means and responsive to said third predetermined pattern of output signals to produce a third output signal to initiate updating of said decoder.

29. The improvement as defined in claim 28 wherein said monitoring means further includes a sixth logic circuit connected to monitor selected output terminals of said clocked delay and storage means, said sixth logic circuit providing a fourth output signal in response to a fourth predetermined pattern of output signals from said clocked delay and storage means to reset timing means controlling said first and second clocked logic circuits and further to preset said timing means such that N clock pulses after said fourth output signal, said selected bits of said digital data signal from said clocked delay and storage means are being utilized to update said decoder.

30. Error correction apparatus for use in an analog-to-digital encoder providing a serial data output signal and utilizing companding techniques to provide a digital word for incremental step size adjustment, said apparatus comprising:

a. a source of clock pulses;

b. a first logic circuit responsive to said clock pulses for generating a first signal in response to a first predetermined number of said clock pulses and for generating a second signal in response to a second predetermined number of said clock pulses;

c. a second logic circuit connected to receive said digital word from said companding counter and responsive to said first signal from said first logic circuit to parallel transfer said digital word to d. a first shift register, said shift register being responsive to said clock pulses to convert said digital word to a first serial data stream;

e. a second shift register connected to receive said serial data output signal from said encoder, said second shift register including plural output means for parallel transfer of said serial data output signal to f. a third logic circuit, said third logic circuit being responsive to a third predetermined number of said clock pulses to selectively transfer said serial data output signal from one of said output means of said second shift register to form a second serial data stream;

g. a fourth logic circuit having a first input, a second input and an output, said first input connected to receive said first serial data stream from said first shift register, said second input connected to receive said second serial data steam from said third logic circuit, said fourth logic circuit being responsive to said second signal from said first logic circuit having a first logical significance to pass said first serial data stream from said first shift register to said output and responsive to said second signal from said first logic means having a second logical significance to pass said second serial data stream from said third logic circuit to said output.

* * * * *